J. E. HALE.
VEHICLE RIM.
APPLICATION FILED SEPT. 11, 1911.
1,013,387.
Patented Jan. 2, 1912.
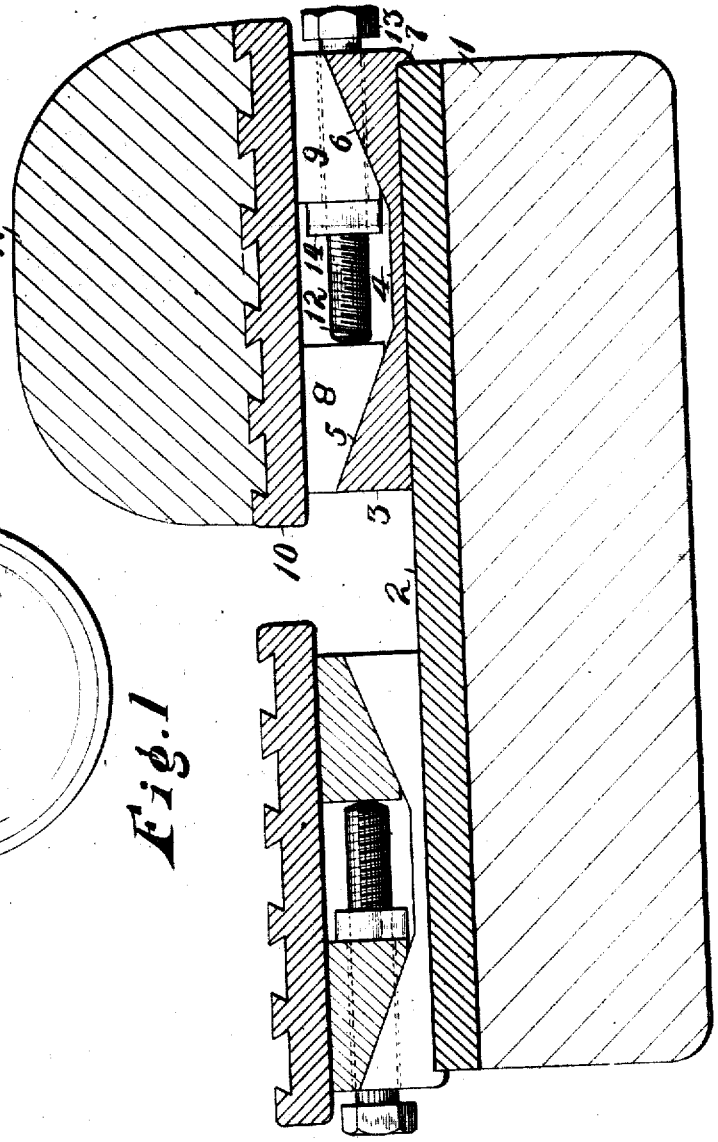
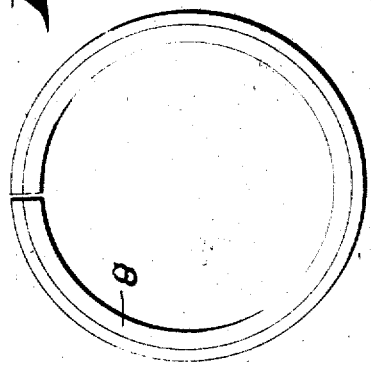
Witnesses:
J. L. McClintock
A. E. Kling
Inventor,
James Ellis Hale,
by C. E. Humphrey.
Atty.

UNITED STATES PATENT OFFICE.

JAMES E. HALE, OF AKRON, OHIO, ASSIGNOR TO THE GOODYEAR TIRE AND RUBBER COMPANY, OF AKRON, OHIO, A CORPORATION OF OHIO.

VEHICLE-RIM.

1,013,387.   Specification of Letters Patent.   Patented Jan. 2, 1912.

Application filed September 11, 1911. Serial No. 648,725.

*To all whom it may concern:*

Be it known that I, JAMES ELLIS HALE, a citizen of the United States, residing at Akron, in the county of Summit and State of Ohio, have invented new and useful Improvements in Vehicle-Rims, of which the following is a specification.

This invention relates to improvements in vehicle wheels, and has especial relation to means for detachably mounting a tire-bearing rim on a wheel.

Wheels as now commonly constructed for vehicles, and especially for automobiles, are made in standard sizes and usually comprise a felly on which is mounted a felly-band having a flat outer face; and this invention contemplates the provision of suitable means for securely mounting a tire-carrying rim on the felly-band in such a manner that it may be readily removed and replaced when desired to enable the user of a vehicle to substitute another rim carrying a fresh tire, at any time without the requirement for especial tools, thereby avoiding the necessity of repairing a tire during a journey.

The invention contemplates the provision of a split contractible ring adapted to be mounted on the felly-band and provided with a grooved outer face, the sides of the groove being inclined and inwardly converging. Within the groove are placed two wedging-elements, such as expansible split rings. The tire-carrying rim is positioned to surround the latter so that when they are shifted sidewise away from each other they will expand and engage the rim and simultaneously contract the grooved-ring to cause the latter to closely grasp the felly-band and at the same time the wedging-element will engage the tire-carrying rim.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the claim hereunto appended.

In the drawings in which similar reference numerals indicate like parts in the different figures, Figure 1, is a transverse sectional view of the rim portion of a vehicle wheel showing portions of the mechanism for supporting the tire-carrying rim in section as well as a tire mounted on one of the rims; Fig. 2, is a view in side elevation of one of the wedging elements employed; and, Fig. 3, is a plan of a nut used for assisting in laterally shifting the position of the wedging-elements.

Referring to the drawings in detail the reference numeral 1 indicates the felly of a wheel on which is mounted a circumferentially-extending felly-band 2, the felly and band being of ordinary standard construction. Arranged to be sprung over and seat on the outer face of the felly-band 2 is a split or broken contractible ring 3 the outer face of which is provided with a central inwardly-extending portion 4, from which extends laterally and outwardly inclined portions 5 and 6 so that the outer face of the ring 3 is provided with a wide shallow groove having inclined lateral portions. In practice, I generally provide the inner face of the ring 3, along one side edge, with an inturned circumferential lip 7, to constitute an abutment or stop for use in positioning the ring on the felly-band and to serve as a guide for the same.

Mounted on the grooved face of the ring 3 are a pair of split or broken expansible rings 8 and 9 which are preferably trapezoidal in cross-section with the inclined faces thereof resting on and opposing the inclined faces 5 and 6 of the ring 3 and with their opposite faces positioned to constitute a seat on which to mount an annular unbroken rim 10 on which is mounted a tire 11 of any suitable conformation or type, whether solid, cushion or pneumatic. It will, of course, be obvious that the type of rim may be varied to suit the kind of tire to be used and any form may be employed so long as its inner face is capable of seating on the outer faces of the rings 8 and 9.

The expanding of the rings 8 and 9 outwardly to engage the rim 10 is caused by shifting them laterally away from each other and this motion is produced through the medium of a plurality of bolts 12 which extend through suitable apertures formed in the contacting portions of the ring 3 and wedging-element 9. These bolts are provided with heads 13 to receive a wrench and have their opposite ends threaded to receive nuts 14. These nuts are preferably elongated so that their ends will encounter the outer face 4 of the ring 3 and the inner face of the tire-carrying rim, to prevent their rotation when the bolts 12 are revolved.

In assembling a wheel for use which embodies this invention the split rim 3 is sprung over and seated on the outer face of the felly-band 2 with the lip 7 thereof engaging one of the lateral faces of the felly-band to assist in positioning it so that the ring will be truly circumferential with respect to the vehicle-wheel. The two trapezoidal-shaped rings are then sprung into place with their thicker portions opposing each other and with their narrower edges extending laterally away from each other. The bolts are then inserted in the appropriate openings and the nuts 14 mounted on them. After this the inextensible tire-carrying band 10 is positioned so that its inner face will surround the outer faces of the rings 8 and 9, after which the bolts 12 are rotated so that as their shank ends engage the wider face of the trapezoidal ring 8 the rotation of the bolts will shift the nuts 14 laterally along the bolts until they encounter the wider face of the opposite ring 9 and thus serve to force the rings apart and as this is kept up it sets up a wedging action between the inner face of the tire-carrying rim 10, and the inclined faces 5 and 6 of the ring 3, which simultaneously tensions the rim, seating it firmly in position and also contracts the ring 3 tightly on the felly-band 2. In ordinary practice all that is necessary to do, to remove the tire-carrying rim 10, is to slightly release the bolts 12 and the rim can be easily slipped from its place, it, of course, not being necessary to entirely remove the wedge-shaped rings 8 and 9 from their seats in order to dismount the rim 10.

It will be apparent that this invention may be employed in connection with a wheel-rim which is designed to carry only a single tire, as well as those types of wheels on which the felly-band is exceedingly wide, and carries a plurality of rims and tires.

I claim:

The combination with a vehicle wheel of a contractible ring mounted thereon, the outer face of said band provided with a shallow groove having inclined sides, a pair of wedge-shaped rings mounted in said groove, a rim mounted on said wedge-shaped rings, and means for forcing said wedge-shaped rings laterally away from each other to cause them to detachably engage the inner face of said rim for holding the latter in place and simultaneously compressing the said grooved ring on said vehicle wheel.

In testimony whereof I have hereunto set my hand in presence of two subscribing witnesses.

JAMES E. HALE.

Witnesses:
 A. E. KLING,
 C. E. HUMPHREY.